Jan. 13, 1953 F. J. SOMERS 2,625,602
FILM PULLDOWN MECHANISM FOR TELEVISION
Filed June 26, 1947 2 SHEETS—SHEET 1
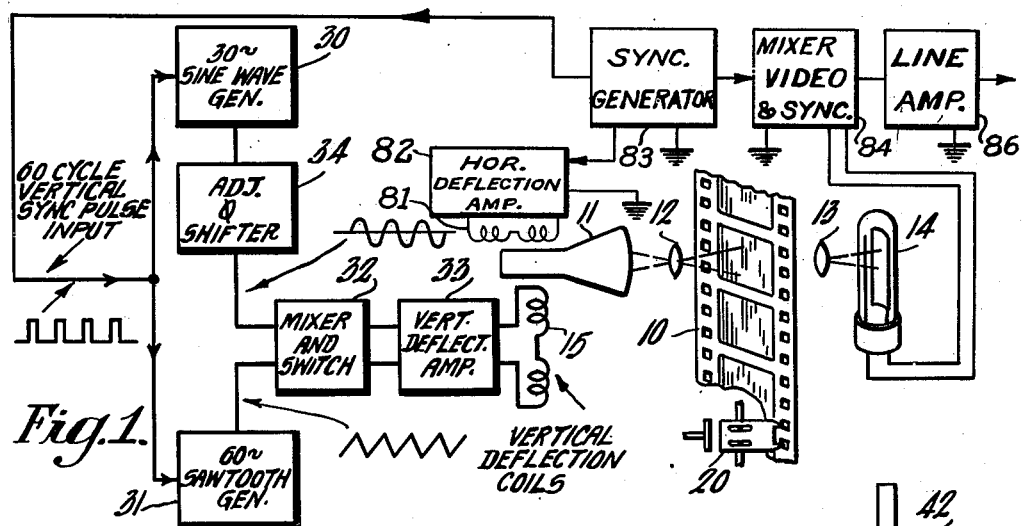
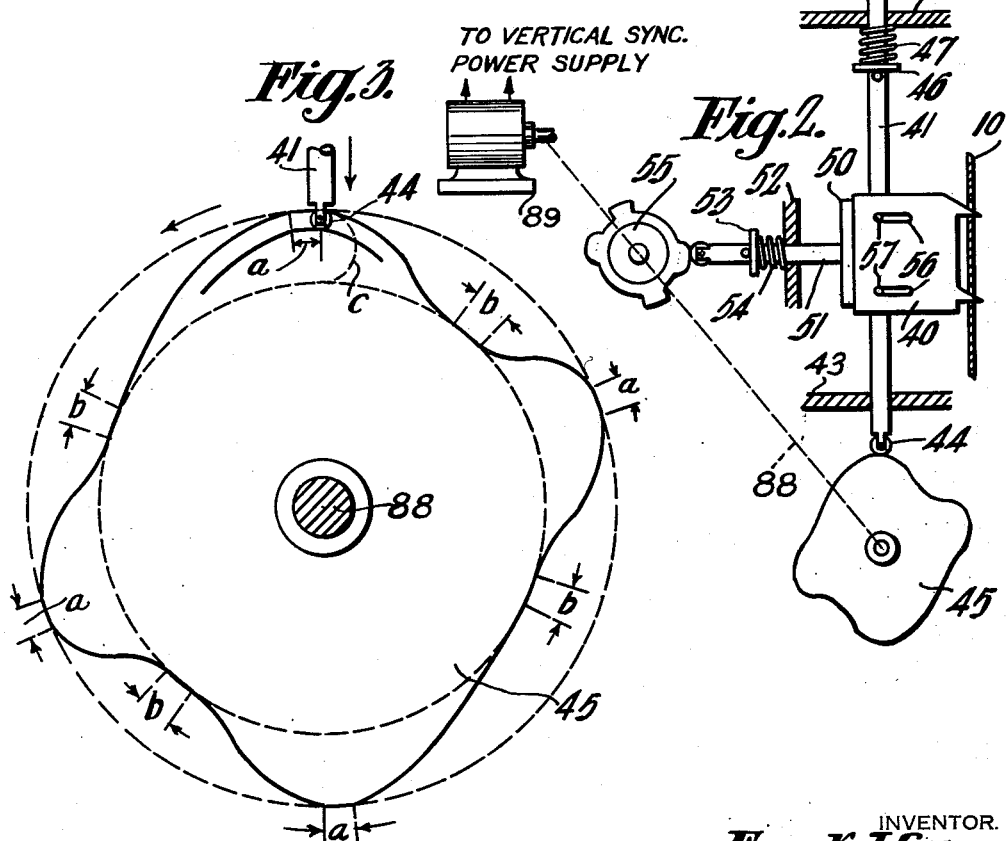
INVENTOR.
Frank J. Somers
BY Samuel B. Smith
ATTORNEY Jan. 13, 1953　　　　　F. J. SOMERS　　　　　2,625,602
FILM PULLDOWN MECHANISM FOR TELEVISION
Filed June 26, 1947　　　　　　　　　　　　　　　2 SHEETS—SHEET 2
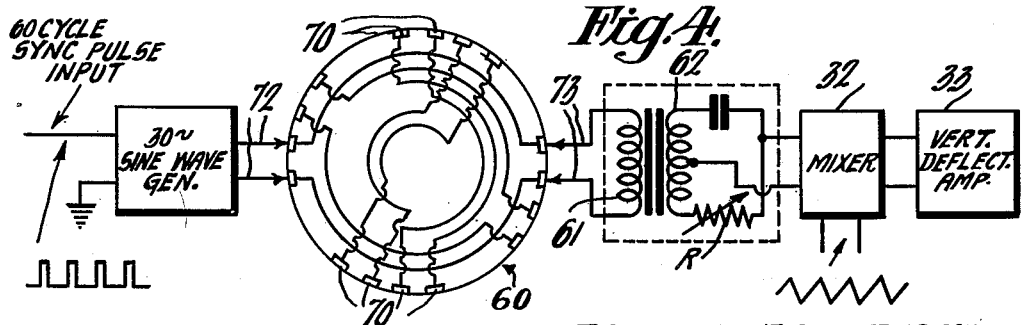
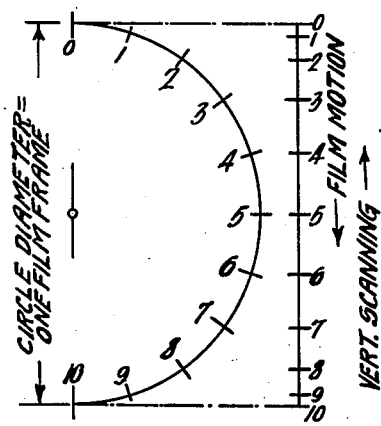
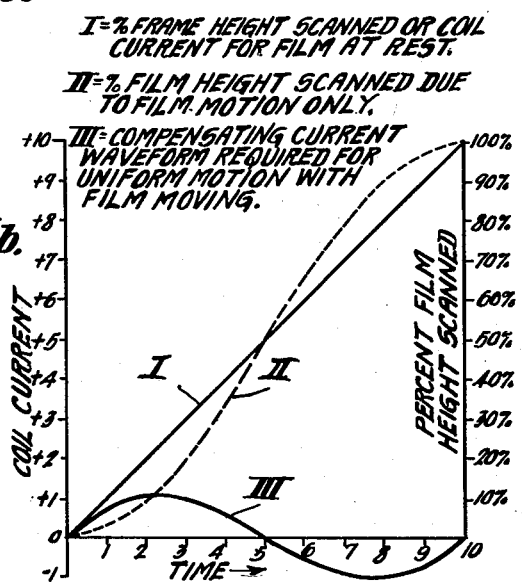
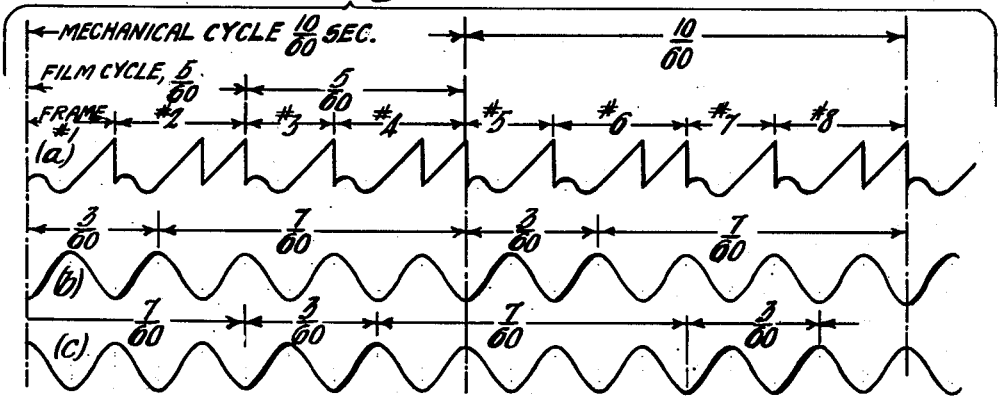
INVENTOR.
*Frank J. Somers*
BY *Samuel D. Smith*
ATTORNEY

UNITED STATES PATENT OFFICE 2,625,602

FILM PULLDOWN MECHANISM FOR TELEVISION

Frank J. Somers, Rockville Centre, N. Y., assignor to Radio Corporation of America, a corporation of Delaware Application June 26, 1947, Serial No. 757,175

4 Claims. (Cl. 178—7.2)

The invention relates, in general, to television apparatus and, more particularly, to such apparatus as is used in scanning motion picture films.

In the art of scanning pictures or images which have been furnished by a motion picture projector for television purposes, there have been used, in general, in the prior art to which this invention belongs, two outstanding methods or systems of developing electrical signals which are representative of the optical values of images recorded on the motion picture film. In both of these methods or systems, the scene to be transmitted has been directed onto a photoemissive area or mosaic and the resulting electrical image so formed is methodically explored by electronic means, one narrow line or strip at a time, in the scanning process. In the first of these systems and methods, the film has been masked from the photoemissive mosaic except at selected intervals, at which time light has been projected through the film to direct a recorded frame of the image on the film onto the photoemissive area or mosaic and the scansion of the mosaic has been accomplished during the intervals when the light from the film is masked from the mosaic. This is possible due to the fact that the scansion tube used has been, in this system, of the so-called "storage" type of tube such, for instance, as the iconoscope.

In the storage type of tube, signals are developed by scanning the photoemissive mosaic with an electron beam, line by line, and transforming the charges on the mosaic which have resulted from the emission of the electrons therefrom under the impetus of the light which has been directed onto it. An intermittent type of projector may be used with the storage type of scansion and film pull-down is accomplished during the time when the projection of light through the film is masked from the photo-emissive mosaic. Scansion of the mosaic by the scanning beam also is accomplished during the same blank-out interval.

In the second of these systems and methods, a non-storage type of scansion tube has been employed and only the light falling upon an element of the photoemissive area at the instant that the area is being scanned is effective in producing a signal. In this system, for every instant that the signal is transmitted the film projector must supply a light image to at least a part of the photoemissive mosaic, although not necessarily from the entire frame of the picture. This means that ordinarily an intermittent type of projector could not be used and heretofore the problem of changing the frames of the film producing the optical image to be televised has had for a solution the use of a so-called continuous projector. This is a type of projector in which the film projection is never masked from the photosensitive mosaic and registration of the frames of the optical image being televised is attempted by the use of a complex optical system. The film itself is moved continuously and hence lacks the type of intermittent motion that takes place when the film is used with the so-called intermittent projector such as is generally used with the first system described. The use of a continuous projector, however, has had serious disadvantages. In the first place, the projector uses a complex and expensive optical system which does not always prove satisfactory in operation. In the second place, light losses in a continuous projector are great and, in the third place, film shrinkage must be compensated for and this shrinkage is never the same for any two reels of film. This means then that continuous readjustments must be made and accurate adjustments under these circumstances are almost impossible. It is an object of the present invention, therefore, to provide a scanning system in which these disadvantages will be overcome.

The normal exposure rate of motion picture film is 24 frames per second and the normal scansion rate in television transmission is 60 interlaced fields per second. Each frame of the film, therefore, must be scanned more than once to provide the required number of scanned fields and this problem has been solved by scanning the even frames twice and the odd frames three times or vice versa. A discussion of the use of motion picture film with television apparatus may be found in the July 1939 issue of the "Journal of the Society of Motion Picture Engineers" in an article entitled "Application of Motion Picture Film to Television" by Engstrom et al. and appearing on page 3 et seq. thereof. A discussion of the continuous type of film scansion also appears in an article in the same edition by P. C. Goldmark and entitled "A Continuous Type Television Film Scanner." With the inherent advantages of an intermittent type of projector, it has been attempted heretofore to use such a projector with a non-storage type of scansion tube. If the conventional intermittent machine were used, however, and the film was scanned during its exposure interval to the photosensitive element of the tube, the pull-down time for the film would have to be of the order of 8% of 1/60 of a second. This would be a prohibitive pull-down speed because, among other things, the sprocket holes of the film would be subjected to such stress that the material around the sprocket holes of the film would be torn. It is another of the objects of the present invention to provide a film scansion apparatus for use with television in which an intermittent type of projector may be used with a non-storage type of photoelectric element without the disadvantage set forth immediately hereinbefore.

Attempts have been made previously to use an intermittent projector with a non-storage type of photoemissive element in a film scansion system and to avoid the difficulties set forth in the previous paragraph by scanning the film while at rest and also scanning the film during the pull-down period and allowing the mechanical motion of the film to contribute to the scanning process. Associated with the film and the photoemissive element has been a cathode ray tube whose beam forms a spot of light on a luminescing target, and the spot is directed through the film onto the photoemissive surface. Scansion is accomplished by a movement of the spot of light by deflection of the cathode ray beam producing it and this has been termed the so-called "flying spot" type of scansion. The normal vertical scanning movement, however, of the spot is a linear function with respect to time, that is, the deflecting force on the beam is produced by a sawtooth waveform of electrical energy. On the other hand, the film, during the pull-down time, is both accelerated and decelerated, the film being accelerated from its stationary position to a maximum pull down speed and then decelerated to a zero speed against its position of rest. This means then that the vertical scanning motion of the light spot produced within the cathode ray tube producing the flying spot must bear some relationship to the speed with which the film is moving if both the scanning spot and the film are to contribute to the vertical scansion. It is an additional object of this invention to provide an apparatus of the general nature hereinbefore described in which a greater scanning accuracy may be obtained where both a flying spot and the movement of the film itself contribute to the vertical scanning. In this system, the pull-down time is of the order of 1/60 of a second which is not prohibitively high and the film is stationary 60% of the time that the machine is running.

It is a further object of my invention to provide an improved apparatus for accomplishing pull-down of the film in an intermittent projector.

Other objects and advantages will become apparent from a reading of the hereinafter appended specification and claims.

My invention, in general, contemplates the provision of a cathode ray tube providing a flying spot of light which is projected through a motion picture film onto a photoelectric element, the output of which is modulated in accordance with the optical values along linear elements of the image recorded on the film, frame by frame. Movement of the flying spot is accomplished by deflection of the cathode ray beam which produces the spot of light. It is also contemplated that the film will be scanned field by field and that 60 such scanned interlaced fields will be developed from 24 recorded frames of image on the film and that this development is accomplished by scanning either odd or even frames each twice and even or odd frames three times each.

The film has associated therewith a pull-down mechanism which consists of a rod having a rider wheel mounted on one end thereof and a spring in engagement with another section thereof to force the rider wheel into intimate contact with the periphery of a cam whose periphery has a plurality of arcuate sections which may be considered sections of the perimeter of a circle, and portions projecting beyond the aforementioned arcs for forcing the rod to the extreme position in its movement. Also associated with the rod is a toothed member which actually engages the sprocket holes of the film and which is slideably movable transversely to the rod. A second cam member is provided which forces an element positioned adjacent the toothed member into contact therewith to move the teeth to engage the sprocket holes of the film. After engagement with the film, the movement of the rod and hence the toothed member is simple harmonic motion. Engagement of the toothed member with the film by its being forced into contact therewith is synchronized with the movement of the rod which supports the toothed member.

A deflection wave is provided for deflecting the cathode ray beam producing the flying light spot linearly during those intervals at which scansion is accomplished while the film is at rest and by a motion caused by a deflection of the beam by a wave formation which is the difference wave between a compensatory wave and a 60 cycle sawtooth wave.

My invention will best be understood by reference to the drawings in which,

Fig. 1 is a block diagram showing of the circuits involved in producing the vertical deflection waves with a flying spot scanning apparatus for film scansion;

Fig. 2 is a pull-down device for moving the film in an intermittent projector constructed in accordance with the present invention;

Fig. 3 is a view of a cam for accomplishing simple harmonic motion pull-down of the film.

Fig. 4 shows schematically an arrangement for adding a compensatory wave to a sawtooth wave when film pull-down is being accomplished; and Fig. 5, sections (a) and (b), and Fig. 6 are explanatory curves.

Referring to Fig. 1, there is shown a schematic representation of an arrangement in accordance with my invention. A film 10, having optical images recorded thereon, is provided for televising. For purposes of simplicity, no attempt has been made to show the sound track on the film since it plays no part in this invention. A cathode ray tube 11 is provided to develop a spot of light of considerable intensity which is directed through the film by lens 12. The modulated spot of light so formed is collected by lens 13 and directed onto phototube 14, which may have an electron multiplier section associated with it if desired. The signals so developed may be used to modulate a television transmitter or may be transmitted directly and used to reproduce the televised image recorded on the film.

Movement of the light spot is accomplished by deflecting the cathode ray beam formed in tube 11 and for this purpose vertical deflecting coils 15 are provided. Horizontal deflection is accomplished by the horizontal deflection coils 81 which are supplied in the usual manner from horizontal deflection amplifier 82. As is now well known in the television art, deflection is accomplished under control of a sync generator 83 of any known or suitable type. In addition to providing control of the horizontal deflection amplifier 82, the sync generator 83 provides a 60 cycle vertical sync pulse input as indicated on Fig. 1 of the drawing. The output from sync generator 83 is fed to a mixer or the like 84 for mixing the sync signals with the video signal derived from the phototube 14. The output of the mixer 84 is fed to the line amplifier 86 for further transmission in accordance with known practices. Since the deflection of the beam in its horizontal coordinate is linear, a sawtooth shaped wave of deflecting current can accomplish this deflection without correction for motion of the film.

Positioned adjacent the film is a pull-down mechanism having a member 20 with two claws or teeth for engaging the film sprocket holes. This portion of the apparatus will be shown in more detail hereinafter in Fig. 2.

A 30 cycle sine wave generator 30 is provided and a 60 cycle sawtooth generator 31. These are fed to a mixer tube and switch arrangement 32. The output of the mixer tube and switch 32 is fed to the vertical deflection amplifier 33 and the output thereof is fed to the vertical deflecting coils 15. The vertical deflection amplifier may be of the type such as shown, for instance, in U. S. Patent No. 2,523,156, granted September 19, 1950, and entitled "Vertical Sweep Voltage Correction for Film Movement in Flying Spot Scansion."

Since one portion of the 30 cycle sine wave between the limits of $$-\frac{\pi}{2} \text{ and} +\frac{\pi}{2}$$

is used while scanning either the odd or even frames and again while scanning even or odd frames at one time after a field scanning of the film at rest and the other time after the scanning twice of a field of the image, a switch must be provided to insert this component into the mixer. This switch will be explained more fully hereinafter with reference to Fig. 4. Further, since the 30 cycle sine wave has one-half thereof mixed with the 60 cycle sawtooth wave and this is between the limits of $$-\frac{\pi}{2} \text{ and} +\frac{\pi}{2}$$

a circuit is provided for obtaining this wave from the 30 cycle sine wave generated. The proper time relationship between the 30 cycle sine wave and the 60 cycle sawtooth wave may be obtained by means of a phase shifting network 34 inserted in the output of the 30 cycle sine wave generator. The switch which has contact elements 70 and which has been already mentioned then is used to reverse the polarity of this wave (shift it 180°) as required for the proper scanning sequence.

The mixer tube arrangement is well known per se and may comprise a multigrid tube having the signals to be mixed each impressed on a separate grid thereof. If it is desired to mix two waves so that they add, both may be brought in with a positive polarity. In this case, one wave is to be subtracted from the other since the wave desired is a difference wave between a 60 cycle sawtooth wave and half of a 30 cycle sine wave and therefore one wave may be brought in at a negative polarity and the other at a positive polarity. This is accomplished by the switch means which will be illustrated schematically in Fig. 4.

Referring to Fig. 2, there is shown a film pull-down mechanism constructed in accordance with my invention. Positioned adjacent the film 10 is a claw member 40 comprising a metallic or other suitable strip of material having two teeth or claws for engaging two of the sprocket holes of the film and also containing two slots in the body portion thereof. A rod 41 is provided which passes through guide members 42 and 43. At the lower end of the rod is a roller wheel 44 which acts as a rider wheel to follow the periphery of a cam 45. Near the upper end of the rod is a fixed collar 46. A spring 47 is positioned about the rod and one end thereof abuts against the guide 42 and the other end against the collar 46. The spring forces the rider wheel 44 against the surface of cam 45 and keeps it in engagement therewith.

Positioned adjacent the claw member 40 is a plate 50 having a rod 51 fastened thereto. The rod passes through a guide 52 and a collar member 53 fastened to the rod has one end of a spring 54 abutting against it while the other end of the spring abuts against guide 52. The spring keeps the plate 50 in a position out of contact with the claw member 40 except when it is forced against it by the shape of the peripheral surface of cam 55. When this happens, the plate 50 is forced inwardly against the claw and the claw slides into engagement with the film sprocket holes, it being allowed to do so by the slots 56 and pins 57. The cam 45 and the cam 55 are suitably mechanically interconnected as indicated by the dotted line 88 and these elements are suitably driven by a motor 89 which may be a synchronous motor provided by power from a power supply controlled by the vertical sync output of sync generator 83.

Referring to Fig. 3, there is shown a view of the cam 45 by means of which the film is caused to be pulled down with a simple harmonic motion. In this illustration, it is assumed that the rider wheel 44 is at the position so that the rod 41 has been forced upwardly to its greatest extremity and the teeth of the claw member 40 have been forced into engagement with the sprocket holes of the film. This cam must have a shape so that the rod 41 will be forced upwardly so that it is ready to begin the simple harmonic pull-down of the film after one frame of the film has been scanned. When this is done, the frame that is pulled down into position must remain in position while it is scanned twice and then the rod should be in position to accomplish the pull down of the film again and scanning sequence and pull-down sequence proceeds in this fashion. For purposes of ease of illustration and clarity, the portions at which time the claw member 40 is forced into engagement with the film have been indicated as the spaces $a$ and the disengagement time intervals have been indicated as the interval $b$. The intervals during which the film remains at rest and is further scanned will be those between the beginning of the interval $b$ and the end of the interval $a$. It will be observed that there are four protrusions on the periphery of the cam that force the rod 41 upwardly and then allow the pull-down of the film to be accomplished with simple harmonic movement. The spaces between the protrusions will vary because the frame of the film remains in a static position longer for the frames that are scanned twice while at rest than it does for those frames which are scanned only once while at rest. The spaces between the sections $a$ and $b$ in the direction opposite to the direction of rotation of the cam will illustrate the pull-down interval of the film. The cam normally will rotate at 6 revolutions per second or 360 per minute.

Referring to Fig. 4, there is shown schematically an arrangement for adding the 30 cycle compensatory wave to the normal 60 cycle sawtooth wave. This compensatory wave must be added to the sawtooth wave to compensate for movement of the film during those intervals when the film is scanned during its pull-down time. The 30 cycle sine wave generator 30 may be controlled by a 60 cycle synchronizing pulse which may be derived from the timer unit associated with the television apparatus. An arrangement for accomplishing the control of a generator of one frequency under the influence of a harmonically related frequency is well known in the art and may be accomplished in accordance with the teachings of U. S. Patent No. 2,269,417, granted January 6, 1942 to Murray G. Crosby. The output of the generator is passed through a switch arrangement which has been illustrated schematically as a drum switch 70. The output from the switch is passed through transformer primary 61 to a secondary 62 which feeds into a phase shifter which is the element 34 of Fig. 1. The necessity for such a switch will be apparent from a study of Fig. 6. The output of the phase shifting network is then fed to the mixer 32. The phase shifter itself may be constructed in accordance with the teachings of the article by A. H. Hartshorne in the "Proceedings of the Physics Society" of London, volume 49, part 2, March 1937.

Referring to Fig. 5, section (a) thereof, there is shown an explanatory curve in which one portion thereof shows a semicircle of 10 units height representing the height of a film frame and the position of the leading edge of the frame at equal time intervals is shown on the arc thereof and its projection onto the line adjacent thereto.

In section (b) of this figure, there are shown three curves and curve I illustrates the percentage of the frame height which is scanned by the coil current when the film is at rest. Curve II represents the percentage of film height scanned due to film motion only. The difference between these curves will show the compensating current that is necessary for uniform scansion while the film is moving and this is curve III. This may be shown to be a 30 cycle sine wave between the limits of $$+\frac{\pi}{2} \text{ and} -\frac{\pi}{2}$$

Referring to Fig. 6, there is shown a series of curves illustrating, in section (a) thereof, the type of waveform forced through the vertical deflection coil for various frames of the film scanned. Sections (b) and (c) show the 30 cycle compensatory waveform and the time of its injection, as the compensatory wave, into the circuit with the 60 cycle sawtooth wave. It will be noted that frame #1 is scanned once while it is moving and once while at rest and that frame #2 is scanned once while moving and twice at rest and sequentially the odd frames are scanned once while moving and once while at rest and even frames in the same manner as the second frame of the picture. It will be noted that, when the time of scanning frame #3 appears, the phase of the 30 cycle sine wave is opposite to that of curve (b) which is normally used for injection into the circuit and is 180° out of its desired position. The function of the switch which has been referred to hereinbefore in connection with Figs. 1 and 4 is to reverse the polarity of this wave so that it may be accurate for compensatory purposes. Accordingly, section (c) of this curve represents a 30 cycle sine wave 180° out of phase with that of portion (b) and this may be developed by the use of the switch. For purposes of clarity, the portions of waves (b) and (c) which are injected into the circuit as compensatory waves have been indicated in heavy lines.

The action of the apparatus is as follows:

When the film is at rest, a frame thereof may be scanned by the flying light spot which is deflected vertically by a 60 cycle sawtooth current forced through the vertical deflecting coils 15. This is merely normal scanning and no motion of the film is involved. Near the end of this scanning, the claw is forced upwardly by one of the extended portions on the periphery of cam 45 and when the claw is in the upward position, plate 50 forces the teeth thereof into engagement with the film sprocket holes, rod 51 having been forced inwardly by one of the protruding portions on the periphery of cam 55. The curvature of the extended portion on the periphery of cam 45 is such that the rod, which is in forced engagement with the cam, is brought down pulling the claw member with it and the movement is accomplished with simple harmonic motion due to the shape of the peripheral surface of cam 45. When this is done, the claw teeth are removed from the film sprocket holes due to plate 50 being retracted when the cam follower on the rod extension thereof passes one of the protruding sections of cam 55, and spring 54 pulls plate 50 back, and further due to the action of spring members (not shown, for ease of illustration) which normally hold the claw member 40 out of engagement with the film. These springs could be in the slots 56 or fastened appropriately to normally pull element 40 away from the film.

The switch member 69, which injects the compensatory wave with the 60 cycle sawtooth wave circuit when the film is in motion may, if desired, be in the form of a drum switch mounted on the same shaft as cam 55. The construction of the switch, in general, comprises a series of what may be considered conducting commutating segments 70 spaced around the edge of a drum and selected segments are electrically cross-connected. This may be accomplished by conductors positioned inside the drum. The equivalent of commutating brushes or wipers may be positioned outside the drum and in contact with the surface thereof so as to engage the commutating segments as the drum rotates. It will be appreciated that the co-acting series of commutating segments may be connected as desired in order to give a predetermined sequence of polarity reversals. Also, instead of connecting the drum switch directly onto the cam shaft, it could be driven by gears which give a selected speed, but this could be a matter of convenience rather than necessity. The sequence shown will be sufficient to give the same polarity for frames #1 and #2 as shown in Fig. 6 and then a reversal of polarity for frames #3 and #4 and the cycle then would be repeated. The spacing between the segments is selected so that the 30 cycle sine wave component is injected into the circuit at the proper time. The 30 cycle sine wave may be impressed across terminals 72 and the output may be taken from conductors 73 which are connected to the primary 61 of the transformer.

At the time when the claw members engage the film sprocket holes and pull-down of the film begins, the 30 cycle wave between the limits of $$+\frac{\pi}{2} \text{ and } -\frac{\pi}{2}$$

may be injected into the 60 cycle sawtooth circuit by way of the mixing circuit and the compensatory wave will alter the waveform of the 60 cycle sawtooth. It may be shown mathematically by a Fourier series that the necessary compensatory waveform is a sine curve of one-half the frequency of the sawtooth wave and, in this case, it will be a sine curve of 30 cycles.

At the end of the pull-down time, the film will remain at rest for a period equal to the scansion time of two of the fields developed by the apparatus. During this time, the switch 60 will be open and accordingly the 30 cycle sine wave will not be injected into the 60 cycle sawtooth circuit. At the end of the double scansion of the frame, however, the claw member 40 will again engage the sprocket holes of the film and film pull-down will be accomplished with a simple harmonic motion and, during the film pull-down time, the 30 cycle sine wave again will be injected into the circuit. When the third frame is reached, the 30 cycle sine wave will be injected into the 60 cycle circuit in a polarity that is reversed with respect to that of the sine wave used as a compensatory wave in the scanning of frames #1 and #2 and this is accomplished by the switch on the shaft of cam 55. For purposes of ease and clarity of illustration, the portions of the sine wave used as compensatory waves are set out in heavier lines in sections (b) and (c) of Fig. 6 than the portions which are not used.

Having now described the invention, what is claimed and desired to be secured by Letters Patent is the following.

What I claim is:

1. In an intermittent pull down film scansion apparatus adapted to receive for scansion an optically recorded image bearing film, a cathode ray tube having means for generating a cathode ray beam, a luminescent target and means for directing the beam toward the target to develop a spot of light, photosensitive means responsive to light directed from the luminescent target to the film undergoing scansion, means for intermittently moving the film from a position at rest to a new position whereby successive frames of the recorded image may be scanned, said movement being accomplished as simple harmonic motion, a sinusoidal wave generator, a sawtooth wave generator, means for combining the waves from said generators in a predetermined phase relationship during said film movements, deflecting means for deflecting the cathode ray beam along a line parallel to film movement and means for controlling the deflection of said beam under the influence of the output wave from said combining means during said film movement whereby to compensate for acceleration and deceleration of the film during movement.

2. In an intermittent pull down film apparatus adapted to receive for scansion an optically recorded image bearing film, a cathode ray tube having means for generating and directing a cathode ray beam toward a target, means to develop signals under the influence of said beam representative of the optical values of incremental areas of the image recorded on the film, means to move the film relatively to the cathode ray tube with simple harmonic longitudinal motion, means for deflecting the beam along a line parallel to film movement, means for generating a sawtooth shaped waveform, means for developing a sinusoidal waveform, means for combining said sinusoidal waveform and said sawtooth waveform to develop a waveform to compensate for the simple harmonic longitudinal motion of said film relatively to the cathode ray tube, means to apply said developed waveform to said deflecting means during relative film movement, and means to apply said sawtooth waveform to said deflecting means during stationary film time.

3. In a television type scansion apparatus for motion picture type film, in which the frame presentation rate of said film is different from the frame presentation rate of said television system, in combination, an intermittent pull down mechanism for propelling the film along a scanning surface, said film propulsion comprising periods of virtual film rest followed by periods of simple harmonic longitudinal film translation, cathode ray beam scanning means for scanning said film during intervals of both film rest and film translation, means activated by a deflection signal for deflecting said scanning beam to and fro along a line parallel to film motion on said scanning surface, a sawtooth wave generator and a sine wave oscillator, means for combining the oscillator output with said sawtooth generator output to form a deflection signal for said deflecting means during film translation, and means to apply said last-named deflection signal to said deflecting means.

4. In a television type scansion apparatus for motion-picture type film in combination, an intermittent pull down mechanism for propelling the film along a scanning surface, said film propulsion comprising periods of virtual film rest followed by periods of simple harmonic longitudinal film translation, cathode ray beam scanning means for scanning said film during intervals of both film rest and film translation, means activated by a deflection signal for deflecting said scanning beam to and fro along a line parallel to film motion on said scanning surface, a source of sawtooth signal, a source of sinusoidal signal, and switch means for applying said sinusoidal signal to said deflecting means only during those intervals of film translation, while applying said sawtooth signal to said deflecting means during periods of film rest and film movement.

FRANK J. SOMERS.

REFERENCES CITED

The following references are of record in the file of this patent:

UNITED STATES PATENTS

| Number | Name | Date |
| --- | --- | --- |
| 2,037,577 | Harries | Apr. 14, 1936 |
| 2,047,533 | Von Ardonne | July 14, 1936 |
| 2,192,121 | Bedford | Feb. 27, 1940 |
| 2,200,342 | Reardon | May 14, 1940 |
| 2,447,839 | Bingley | Aug. 24, 1948 |